(12) United States Patent
Hatch et al.

(10) Patent No.: US 10,253,848 B2
(45) Date of Patent: Apr. 9, 2019

(54) THRUST BALANCED PLANETARY GEAR ASSEMBLIES

(71) Applicant: Faraday & Future Inc., Gardena, CA (US)

(72) Inventors: Erik Hatch, Menifee, CA (US); Kyle Hickey, Moorpark, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 338 days.

(21) Appl. No.: 14/929,041

(22) Filed: Oct. 30, 2015

(65) Prior Publication Data

US 2017/0122407 A1   May 4, 2017

(51) Int. Cl.
*F16H 1/28* (2006.01)
*F16H 55/17* (2006.01)
*F16H 57/08* (2006.01)

(52) U.S. Cl.
CPC .............. *F16H 1/28* (2013.01); *F16H 55/17* (2013.01); *F16H 57/08* (2013.01); *F16H 2001/2881* (2013.01)

(58) Field of Classification Search
CPC .............................. F16H 1/2809; F16H 55/17
See application file for complete search history.

(56) References Cited

U.S. PATENT DOCUMENTS

| | | | | |
|---|---|---|---|---|
| 2,703,021 A | * | 3/1955 | Stoeckicht | F16H 1/2809 475/344 |
| 5,459,925 A | * | 10/1995 | Akeel | B25J 9/102 29/893.2 |
| 6,618,278 B2 | | 9/2003 | Suzuki et al. | |
| 6,621,701 B2 | | 9/2003 | Tamba et al. | |
| 7,076,875 B2 | * | 7/2006 | Puetz | B23P 15/14 29/893 |
| 7,710,721 B2 | | 5/2010 | Matsuo et al. | |
| 7,830,689 B2 | | 11/2010 | Nakamura et al. | |
| 7,855,887 B2 | | 12/2010 | Kakuda et al. | |
| 7,965,510 B2 | | 6/2011 | Suzuki et al. | |
| 8,072,758 B2 | | 12/2011 | Groppo et al. | |
| 8,159,849 B2 | | 4/2012 | Nakajima et al. | |

(Continued)

OTHER PUBLICATIONS

Notice of Allowance, dated Nov. 20, 2015, U.S. Appl. No. 14/841,520, filed Aug. 31, 2015.

*Primary Examiner* — Tisha D Lewis
(74) *Attorney, Agent, or Firm* — Knobbe Martens Olson & Bear LLP

(57) ABSTRACT

A planetary gear system includes a ring gear supported by a housing, the ring gear having teeth on an inner sidewall of the ring gear, and a plurality of helical gears, each of the plurality of helical gears including a first cylindrical segment having teeth that are configured to mate with teeth of an input drive shaft, the teeth of the first cylindrical segment having helical teeth disposed at a first angle, and a second cylindrical segment extending from the first cylindrical segment, the second cylindrical segment having teeth configured to mate with teeth of the ring gear, the teeth of the second cylindrical segment having helical teeth disposed at a second angle. Advantageously, a linear axial force produced by each of the plurality of helical gears is substantially zero, which creates a thrust balancing within the planetary gear system.

17 Claims, 6 Drawing Sheets

(56) References Cited

U.S. PATENT DOCUMENTS

| | | | |
|---|---|---|---|
| 8,357,071 B2* | 1/2013 | Hino | B62M 11/14 |
| | | | 475/338 |
| 8,587,977 B2 | 11/2013 | Nishikimi et al. | |
| 8,614,906 B2 | 12/2013 | Nakajima et al. | |
| 8,699,254 B2 | 4/2014 | Nishikimi et al. | |
| 8,848,370 B2 | 9/2014 | Shin et al. | |
| 8,953,335 B2 | 2/2015 | Abe et al. | |
| 9,042,101 B2 | 5/2015 | Tokuyama et al. | |
| 9,042,147 B2 | 5/2015 | Ishii et al. | |
| 9,048,721 B2 | 6/2015 | Abe et al. | |
| 9,241,428 B1 | 1/2016 | Doo et al. | |
| 2002/0034087 A1 | 3/2002 | Suzuki et al. | |
| 2003/0067748 A1 | 4/2003 | Tamba et al. | |
| 2004/0251064 A1* | 12/2004 | Imai | B60W 20/40 |
| | | | 180/65.23 |
| 2006/0052914 A1 | 3/2006 | Kubokawa et al. | |
| 2006/0274561 A1 | 12/2006 | Ahmed et al. | |
| 2008/0251909 A1 | 10/2008 | Tokuyama et al. | |
| 2011/0205724 A1 | 8/2011 | Nakajima et al. | |
| 2013/0039009 A1 | 2/2013 | Shin et al. | |
| 2015/0029666 A1 | 1/2015 | Kosuga et al. | |

\* cited by examiner

THRUST BALANCED PLANETARY GEAR ASSEMBLIES

FIELD OF THE PRESENT DISCLOSURE

The present disclosure relates generally to planetary gears, and more specifically, but not by limitation, to thrust balanced planetary gears that comprise helical gears that transfer torque from an input drive shaft to an output drive shaft.

BACKGROUND

It should not be assumed that any description in this section constitutes prior art merely by virtue of their inclusion in this section.

A planetary gear system is often chosen when it is desirable to convert an input rotation into a desired output rotation. Often, the gear ratio of a planetary gear assembly is designed so that the output rotation has a unique angular velocity and torque, which differ from those of the input rotation. A planetary gear assembly is often used to convert a rotational input to a rotational output having torque and angular velocity characteristics suitable for a particular application.

A conventional planetary gear assembly is generally configured from a sun gear, numerous planet gears, and a ring gear. The sun gear is characterized by a toothed exterior periphery. It is this sun gear that defines the central axis in a standard planetary gear. The planet gears each have a toothed exterior periphery that is configured to mesh with the toothed exterior periphery of the sun gear. The ring gear is characterized by a toothed interior periphery that is configured to mesh with the toothed exterior periphery of the planet gears. In some planetary gear configurations, a carrier is also included and connected to each of the planet gears.

SUMMARY OF THE PRESENT DISCLOSURE

According to some embodiments, the present disclosure may be directed to a planetary gear assembly, comprising: (a) a ring gear supported by a housing, the ring gear comprising teeth on an inner sidewall of the ring gear; and (b) a plurality of helical gears, each of the plurality of helical gears comprising: (i) a first cylindrical segment having teeth that are configured to mate with teeth of an input drive shaft, the teeth of the first cylindrical segment having helical teeth disposed at a first angle; and (ii) a second cylindrical segment extending from the first cylindrical segment, the second cylindrical segment having teeth configured to mate with teeth of the ring gear, the teeth of the second cylindrical segment having helical teeth disposed at a second angle, wherein a linear axial force produced by each of the plurality of helical gears is substantially zero.

According to some embodiments, the present disclosure may be directed to a helical gear, comprising: (a) a first cylindrical segment having teeth that are configured to mate with the teeth of a terminal end of an input drive shaft, the teeth having sidewalls that extend at a helix angle relative to a first helical reference line; and (b) a second cylindrical segment extending from the first cylindrical segment, the second cylindrical segment having teeth configured to mate with teeth of a ring gear, the teeth of the second cylindrical segment having sidewalls that that extend at a helix angle relative to a second helical reference line, wherein the helical gear produces no linear axial force when rotated by the input drive shaft and when applying force to the teeth of the ring gear.

According to some embodiments, the present disclosure may be directed to a planetary gear assembly, comprising: (a) an input drive shaft that delivers a torque force, and further wherein a terminal end of the input drive shaft comprise teeth that create a helical pattern; (b) a ring gear supported by a housing, the ring gear comprising teeth on an inner sidewall of the ring gear; (c) an output drive shaft that outputs rotational force imparted by an output drive shaft carrier, wherein the output drive shaft carrier is coupled to the ring gear; and (d) a plurality of helical gears, each of the plurality of helical gears comprising: (i) a first cylindrical segment having teeth that are configured to mate with teeth of the terminal end of the input drive shaft, the teeth of the first cylindrical segment having helical teeth disposed at a first angle; and (2) a second cylindrical segment extending from the first cylindrical segment, the second cylindrical segment having teeth configured to mate with teeth of the ring gear, the teeth of the second cylindrical segment having helical teeth disposed at a second angle, wherein a linear axial force produced by each of the plurality of helical gears is substantially zero.

BRIEF DESCRIPTION OF THE DRAWINGS

Certain embodiments of the present disclosure are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
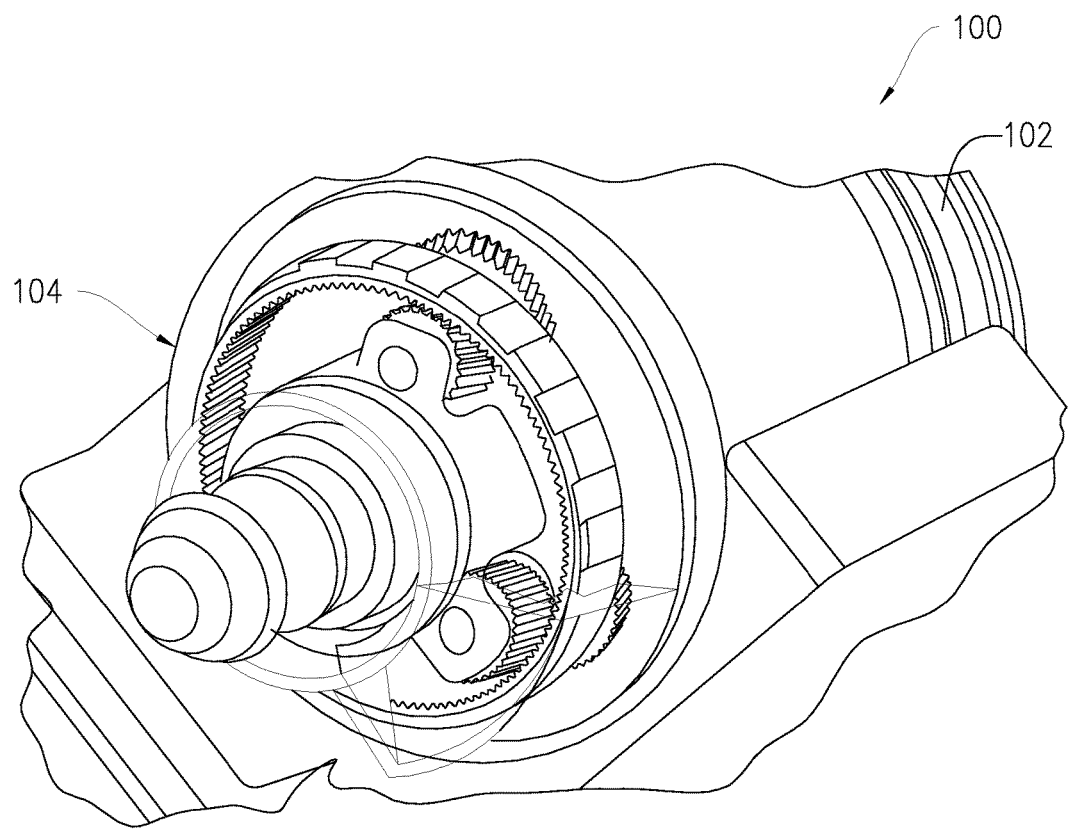
FIG. 1 is a perspective view of an example assembly that comprises a planetary gear assembly of the present disclosure.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

In general, the present disclosure is related to planetary gear assemblies. In more detail, embodiments of the present disclosure comprise planetary gear assemblies, which may incorporate helical gearsets that can be configured to rotate and deliver torque and power while producing substantially no linear axial thrust forces (i.e., thrust balanced). Advantageously, these thrust balanced gearsets may ensure that torque forces are transferred without waste or unnecessary movement within the gearset housing, which could lead to wear and tear on the planetary gear assembly.

By adjusting a helix angle on the helical gearset as well as other parameters of the gearset such as gearset segment diameter, the linear axial thrust load in the gearset can be balanced to result in a low net force on the planet. Some embodiments include a stepped planet configuration that provides a benefit across the gears of different sizes.

These and other advantages of the present disclosure will be described in greater detail with reference to the collective drawings (e.g., FIGS. 1-5B).

FIG. 1 illustrates an example device 100 that can comprise a gearbox housing 102. The gearbox housing 102 can be mounted within a vehicle. An example planetary gearbox assembly 104 can be disposed within the gearbox housing 102. Additional details on the planetary gearbox assembly 104 are provided in FIGS. 2-4.

Figure 2:
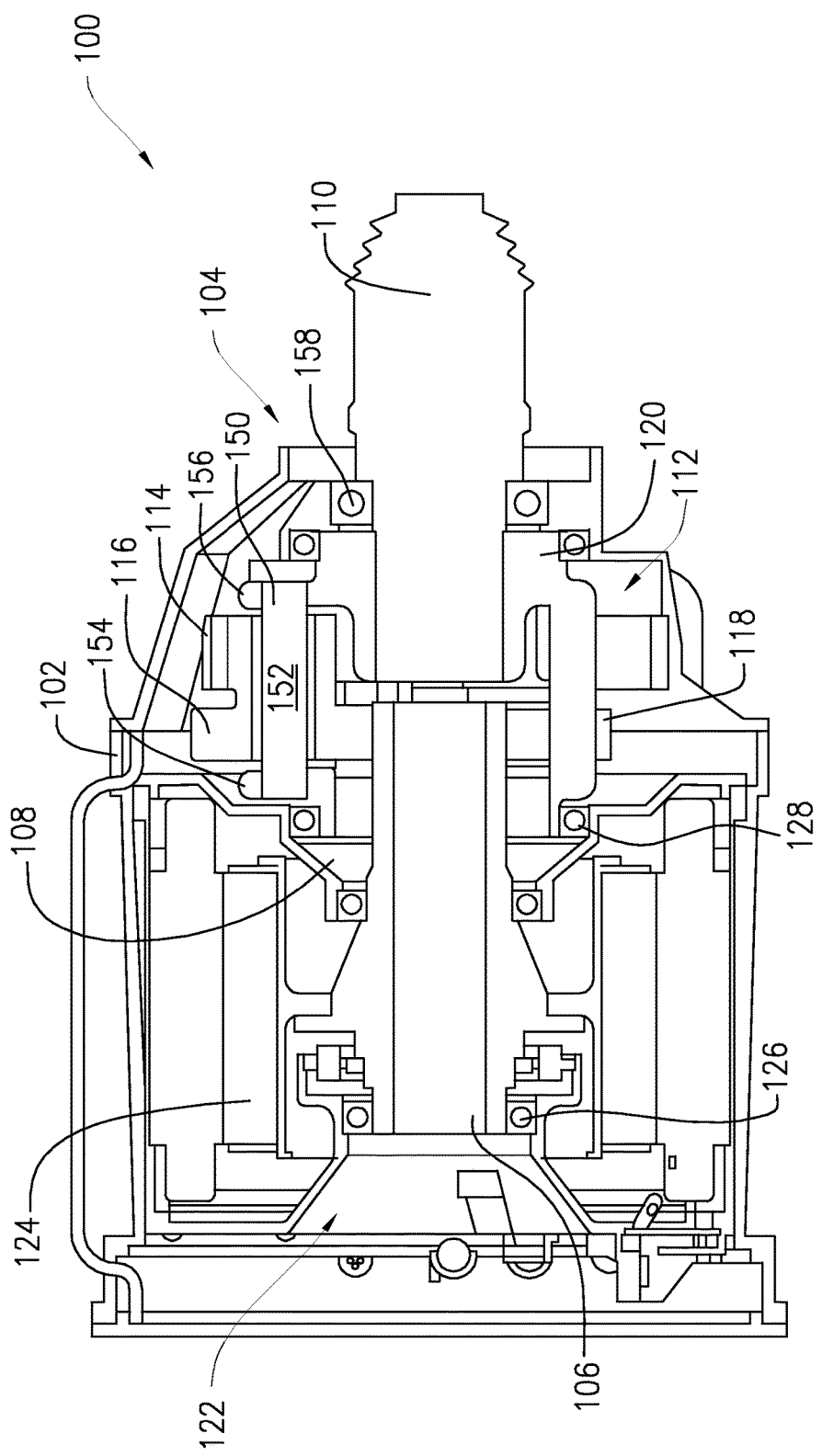
FIG. 2 is a cross-sectional view of the example assembly of FIG. 1.
Figure 3:
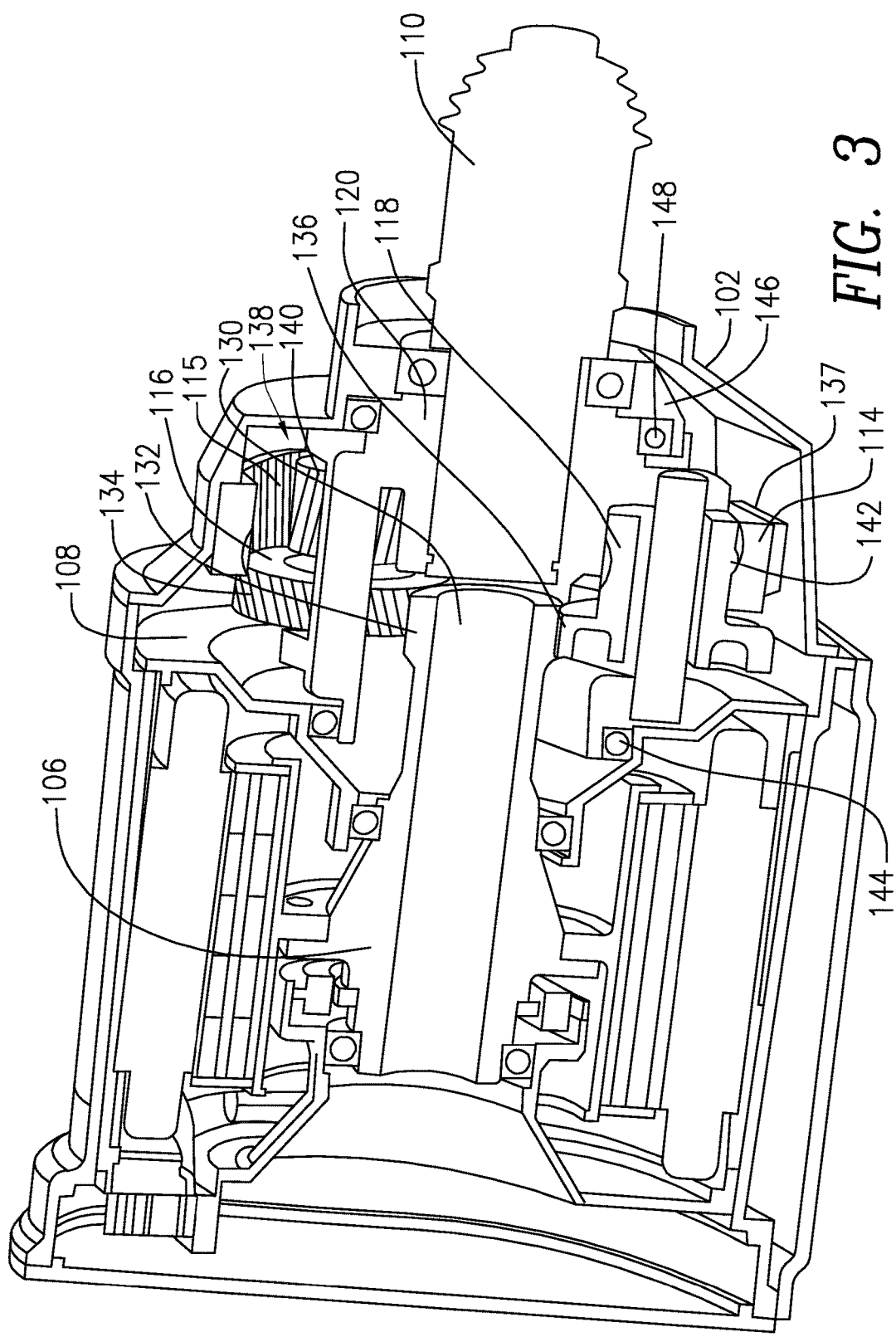
FIG. 3 is a perspective, cross-sectional view of the example assembly of FIG. 1.
Figure 4:
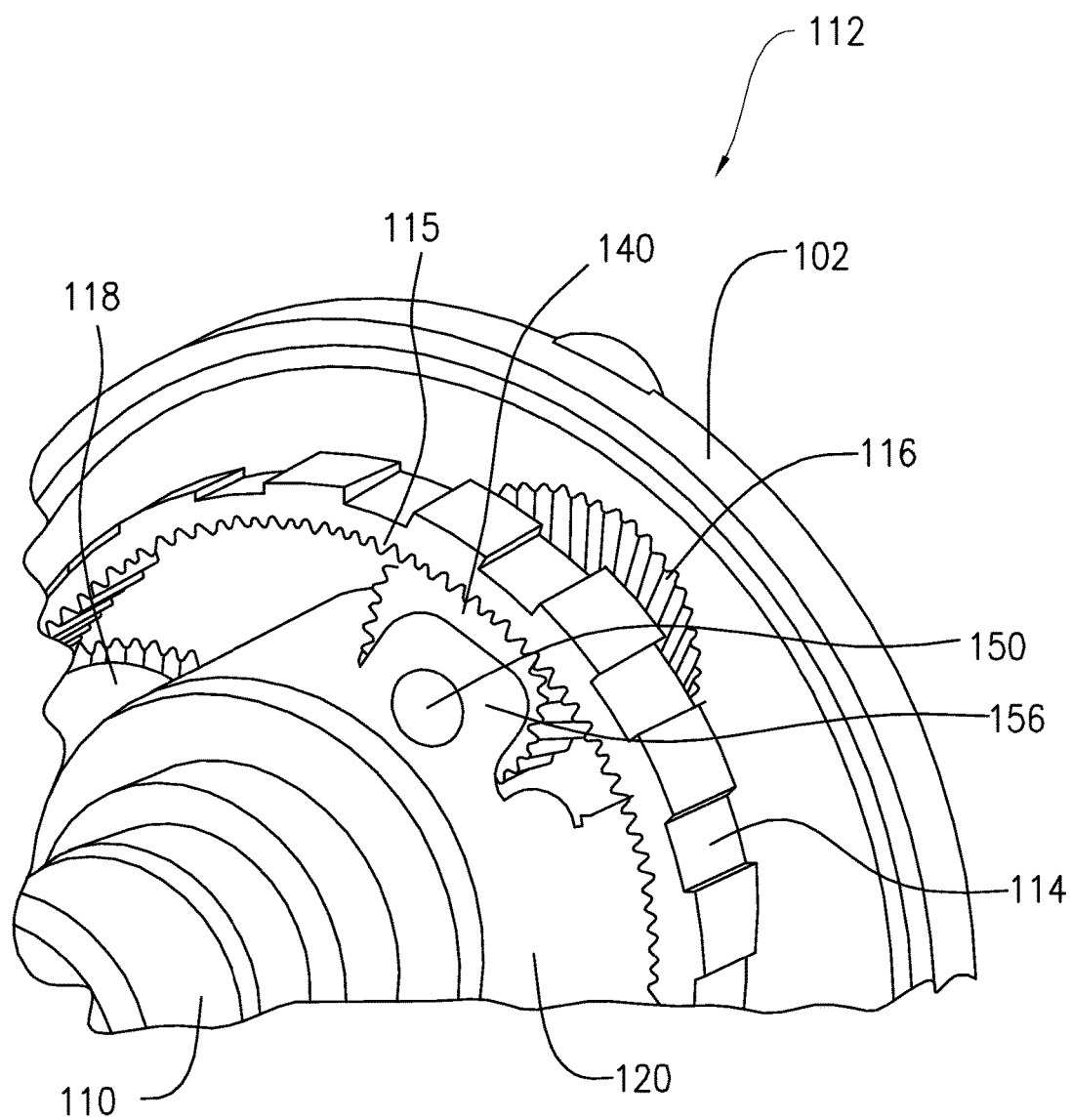
FIG. 4 is a close up view of a planetary gear assembly of the present disclosure.

Referring to FIGS. 2-4 collectively, the example gearbox assembly 104 is illustrated as comprising an input drive shaft 106, a housing bracket 108, an output drive shaft 110, and a planetary gear assembly 112. The planetary gear assembly 112 can, in some embodiments, comprise a ring gear 114, a plurality of helical gears (of which only two are illustrated in FIG. 2) such as helical gear 116 and helical gear 118, and an output drive shaft carrier 120. In one embodiments, the planetary gear assembly 112 can comprise three helical gears that are each identical to one another. Additional details regarding the configuration of the helical gears are provided infra with reference to FIGS. 5A and 5B.

The input drive shaft 106 can comprise a tubular length of material that can couple with an output drive of a motor, such as an electric motor 105. In one embodiment, the input drive shaft 106 can comprise a driveshaft interface 122 that couples with a driveshaft of a motor.

The input drive shaft 106 can impart torque forces (e.g., rotational) onto the planetary gear assembly 112 in order to rotate the output drive shaft 110. In some embodiments, the input drive shaft 106 can be rotatingly supported within a magnetized rotor 124 of the motor 105. The magnetized rotor 124 rotates with the input shaft 106 on thrush bearings that supporting the input drive shaft 106 using a pair of bearings 126 and 128. The bearing 128 may be coupled with the housing bracket 108 in some embodiments.

Specifically, in FIG. 3, the input drive shaft 106 can include a terminal end 130 that may comprise teeth 132 that create a helical pattern that can be configured to mate with teeth 134 of a first segment of helical gear 116 and teeth 136 of the helical gear 118. Helical gears 116 and 118 can be stepped planetary gears having two gear segments, described further below in regard to FIGS. 5A and 5B.

Also in FIG. 3, the ring gear 114 may comprise teeth 115 on an inner sidewall 138 that mate with teeth 140 of a second segment of the helical gear 116 and teeth 142 of the helical gear 118. An outer sidewall 137 of the ring gear 114 can contact the gearbox housing 102 to fixedly position the ring gear 114, in this example.

According to some embodiments, the housing bracket 108 can support both the input drive shaft 106 and the output drive shaft carrier 120.

The output drive shaft carrier 120 can rotate around the input and output drive shafts 106 and 110. The output drive shaft carrier 120 may be rotatingly supported on one end by the housing bracket 108 with a bearing 144 and on an opposing end by a cover 146 of the gearbox housing 102 with a bearing 148. In some embodiments, gearbox housing 102 and the cover 146 are a unitary or singular component.

Turning back to FIG. 2, the output drive shaft carrier 120 can comprise an arm, such as arm 150 for each of the helical gears of the planetary gear assembly 112. In one embodiment, the arm 150 may comprise a shaft 152 supported on either end of the output drive shaft carrier 120 by armature supports 154 and 156. The shaft 152 is in fixed placement within the armature supports 154 and 156 in some embodiments. Each of the shafts can comprise a bearing (not shown) that support a helical gear.

The output drive shaft 110 can be coupled directly to the output drive shaft carrier 120 such that rotation of the output drive shaft carrier 120 by the helical gears of the planetary gear assembly 112 can cause rotation of the output drive shaft 110. In some embodiments, the output drive shaft 110 can be rotatingly supported at an outer opening of the gearbox housing 102 with a bearing 158.

Figure 5A:
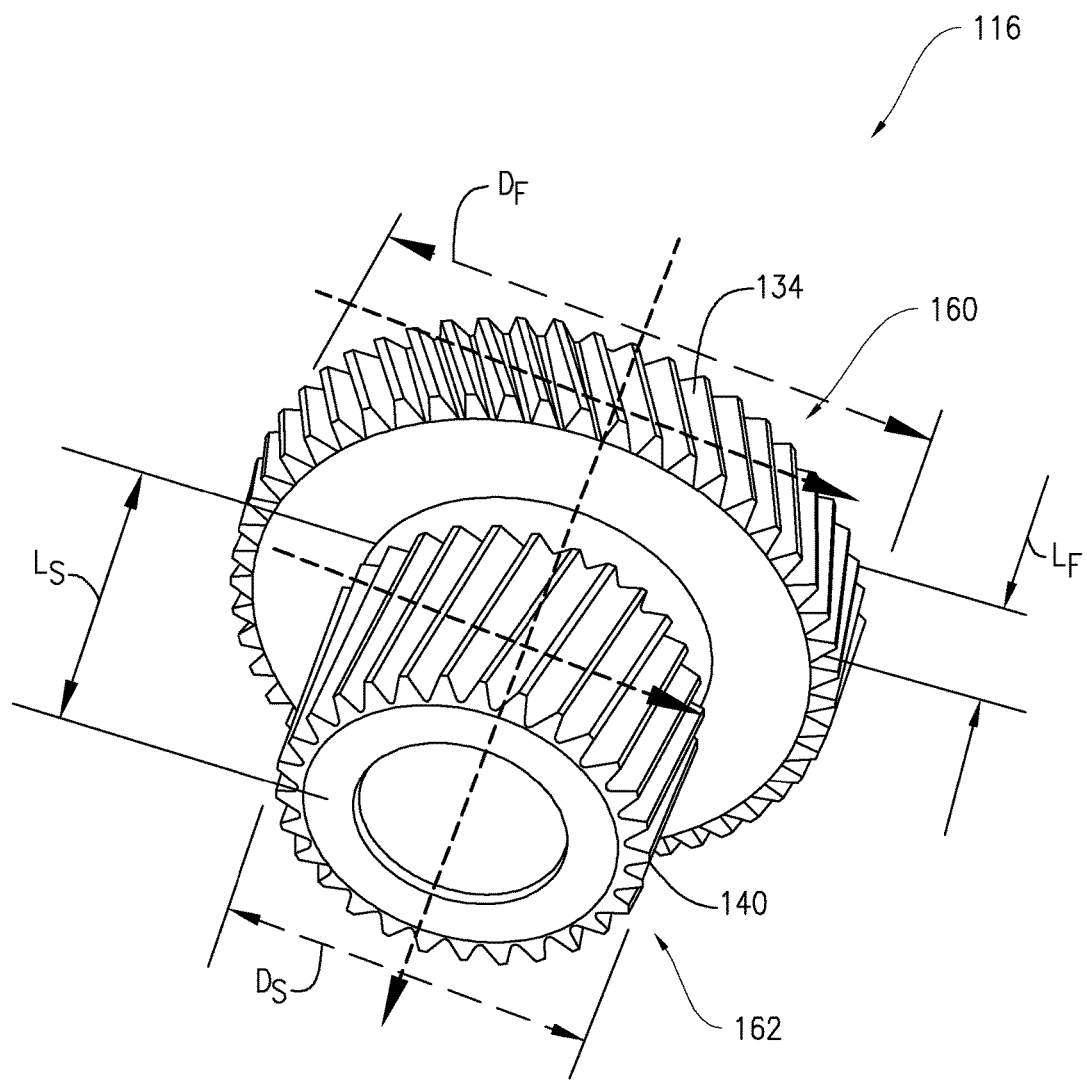
FIGS. 5A and 5B collectively illustrate perspective views of an example helical gear for use with the planetary gear assemblies of the present disclosure.
Figure 5B:
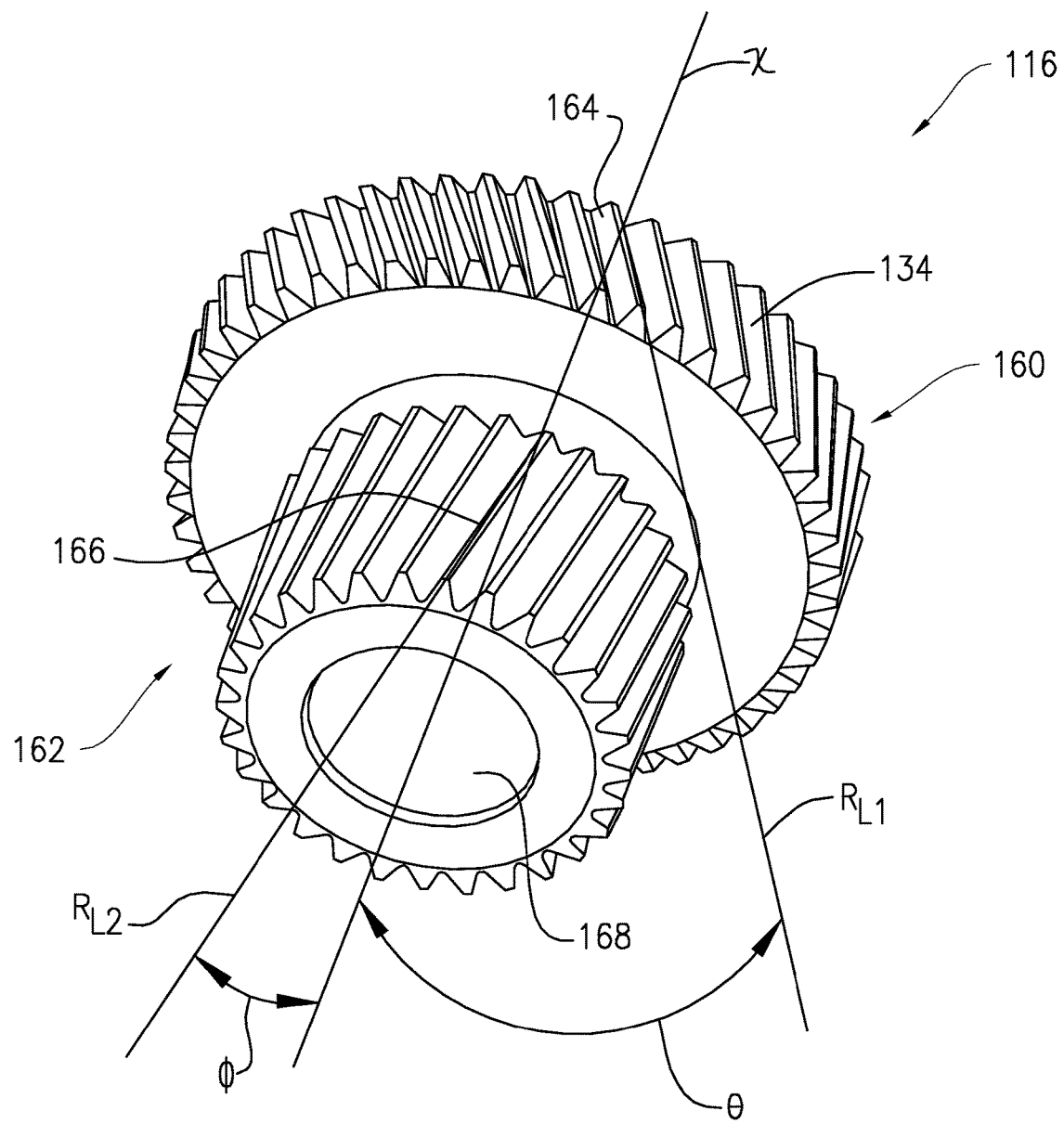

An example helical gear 116 is illustrated in FIGS. 5A and 5B. The helical gear 116 can comprise a first segment 160 and a second segment 162. The first segment 160 can comprise teeth 134. The teeth 134 can be disposed on an outer peripheral surface of the first segment 160. The helical gear 116 may have a step down configuration between the first segment 160 and the second segment 162. More specifically, the first segment 160 can have a diameter $D_F$ that is greater in diameter than a diameter $D_S$ of the second segment 162. In this example configuration, helical gear 116 may also be referred to as a stepped planetary gear or stepped planet.

In some embodiments, the second segment 162 can comprise teeth 140 that are disposed on an outer peripheral surface of the second segment 162.

According to some embodiments, the first segment 160 can have a length/width $L_F$ that is smaller in size than a length/width $L_S$ of the second segment 162.

Referring especially to FIG. 5B, in some embodiments, the teeth 134 of the first segment 160 can be comprised of teeth, such as tooth 164 that can extend at a helix angle relative to a first helical reference line $RL_1$. All of the teeth of the first segment 160 may be set to the same angle as tooth 164. The first helical reference line $RL_1$ can be measured relative to a central axis X of the helical gear 116. The teeth of the first segment 160 can have a pitch that can match a pitch of teeth 132 of the terminal end 130 of the input drive shaft 106. In one embodiment, the helix angle is 20 or 25 degrees from center line of the gear.

Also, the teeth of the first segment 160 can be defined by a first helix angle θ formed between the central axis X and the first helical reference line $RL_1$.

The teeth 140 of the second segment 162 can be comprised of teeth, such as tooth 166 that extend at a helix angle relative to a second helical reference line $RL_2$. The second helical reference line $RL_2$ can also be measured relative to the central axis X of the helical gear 116. The teeth of the second segment 162 can be defined by a second angle ϕ formed between the central axis X and the second helical reference line $RL_2$.

In some embodiments, the first angle θ can be greater than the second angle ϕ.

Advantageously, the diameter $D_F$, diameter $D_S$, first helix angle θ, and second helix angle ϕ can be cooperatively selected such that the helical gear 116 produces no (or substantially no) linear axial forces within when coupled with the input drive shaft 106 and the ring gear 114. To be sure, a helical or screw type gear tooth configuration can produce both a linear axial force component A and a perpendicular or radial force component B due to the teeth of the helical gear 116 being set at an angle relative to the central axis X rather than in alignment with the central axis X. To be sure, diameters of the helical gear (both the first and second cylindrical sections) and the helix angle of the helical gear are balanced so as to produce little to no net axial thrust within the planetary gear assembly 112.

Linear axial forces may function to cause the helical gear 116 to translate along the central axis X in a forward manner when torque is applied by the input drive shaft 106 when the input drive shaft 106 rotates in a first direction and rearwardly when the input drive shaft 106 rotates in a second direction.

Selection of the diameter $D_F$, diameter $D_S$, first helix angle θ, and second helix angle ϕ can serve to reduce or eliminate linear axial movement of the helical gear 116.

In some embodiments, the teeth 134 of the first segment 160 can be arranged in a first directional orientation, such as right handed. The teeth 140 of the second segment 162 can be arranged in a second directional orientation, such as a left handed orientation, which is opposite that of the teeth 134 of the first segment 160.

Again, the input drive shaft 106 can have teeth that are adapted to mate with the teeth 134 of the first segment 160 and the ring gear 114 can have teeth that are adapted to mate with the teeth 140 of the first segment 160. The teeth of the second segment 162 have a pitch that matches a pitch of teeth 136 of the ring gear 114.

As mentioned above in regard to FIG. 2, the helical gear 116 can comprise a central aperture 168 (shown in FIG. 5B) that is configured to receive the shaft 152 of an arm 150 of the output drive shaft carrier 120. The helical gear 116 can be compress fit or otherwise joined to the shaft 152. In one embodiment, the helical gear 116 is coupled with the shaft 152 using a needle roller bearing.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A planetary gear assembly, comprising:
   a ring gear supported by a housing, the ring gear comprising teeth on an inner sidewall of the ring gear; and
   a plurality of helical gears, each of the plurality of helical gears comprising:
      a first cylindrical segment having teeth that are configured to mate with teeth of an input drive shaft, the teeth of the first cylindrical segment having helical teeth disposed at a first angle; and
      a second cylindrical segment extending from the first cylindrical segment, the second cylindrical segment having teeth that are configured to mate with teeth of the ring gear, the teeth of the second cylindrical segment having helical teeth disposed at a second angle,
   wherein the first angle is greater in magnitude than the second angle.

2. The planetary gear assembly according to claim 1, wherein a linear axial force extends in a direction that is parallel to a central axis of the input drive shaft.

3. The planetary gear assembly according to claim 1, wherein the plurality of helical gears are each rotatingly couplable to an output drive shaft carrier.

4. The planetary gear assembly according to claim 3, wherein each of the plurality of helical gears is rotatingly supported on an arm of the output drive shaft carrier.

5. The planetary gear assembly according to claim 4, further comprising a thrust bearing associated with each of the plurality of helical gears and their respective arms.

6. The planetary gear assembly according to claim 1, wherein an outer sidewall of the ring gear is fixedly associated with the housing of the planetary gear assembly.

7. The planetary gear assembly according to claim 1, wherein the teeth of the first cylindrical segment extend in a first directional orientation and the teeth of the second cylindrical segment extend in a second directional orientation that is opposite of the first directional orientation.

8. The planetary gear assembly according to claim 1, wherein the input drive shaft that delivers a torque force, and further wherein a terminal end of the input drive shaft comprises teeth that create a helical pattern that is configured to mate with the teeth of the second cylindrical segment of each of the plurality of helical gears.

9. The planetary gear assembly according to claim 1, further comprising an output drive shaft that outputs rotational force imparted by an output drive shaft carrier, wherein the output drive shaft carrier is rotatingly coupled to the ring gear by the plurality of helical gears.

10. The planetary gear assembly according to claim 1, wherein a linear axial force produced by each of the plurality of helical gears is substantially zero.

11. A helical gear, comprising:
   a first cylindrical segment having teeth that are configured to mate with the teeth of a terminal end of an input drive shaft, the teeth of the first cylindrical segment having helical teeth that extend at a first helix angle relative to a first helical reference line; and
   a second cylindrical segment extending from the first cylindrical segment, the second cylindrical segment having teeth that are configured to mate with teeth of a ring gear, the teeth of the second cylindrical segment having helical teeth that extend at a second helix angle relative to a second helical reference line, wherein the first helix angle is greater in magnitude than the second helix angle.

12. The helical gear according to claim 11, wherein the teeth of the first cylindrical segment extend in a first directional orientation and the teeth of the second cylindrical segment extend in a second directional orientation that is opposite of the first directional orientation.

13. A planetary gear assembly, comprising:
an input drive shaft that delivers a torque force, and further wherein a terminal end of the input drive shaft comprises teeth that create a helical pattern;
a ring gear supported by a housing, the ring gear comprising teeth on an inner sidewall of the ring gear;
an output drive shaft that outputs rotational force imparted by an output drive shaft carrier, wherein the output drive shaft carrier is rotatingly coupled to the ring gear; and
a plurality of helical gears, each of the plurality of helical gears comprising:
a first cylindrical segment having teeth that are configured to mate with teeth of the terminal end of the input drive shaft, the teeth of the first cylindrical segment having helical teeth disposed at a first helix angle; and
a second cylindrical segment extending from the first cylindrical segment, the second cylindrical segment having teeth that are configured to mate with teeth of the ring gear, the teeth of the second cylindrical segment having helical teeth disposed at a second helix angle,
wherein a linear axial force produced by each of the plurality of helical gears is substantially zero.

14. The planetary gear assembly according to claim 13, wherein the first helix angle is greater in magnitude than the second helix angle.

15. The planetary gear assembly according to claim 13, wherein the teeth of the first cylindrical segment extend in a first directional orientation and the teeth of the second cylindrical segment extend in a second directional orientation that is opposite of the first directional orientation.

16. The planetary gear assembly according to claim 13, further comprising a thrust bearing associated with each of the input drive shaft and output drive shaft.

17. The helical gear according to claim 11, wherein the helical gear produces no linear axial force when rotated by the input drive shaft and when applying force to the teeth of the ring gear.

* * * * *